(12) United States Patent
Arlaban Gabeiras et al.

(10) Patent No.: US 9,238,923 B2
(45) Date of Patent: Jan. 19, 2016

(54) WIND TURBINE ASSEMBLY SYSTEM

(71) Applicant: ACCIONA WINDPOWER, S.A., Navarra (ES)

(72) Inventors: Teresa Arlaban Gabeiras, Navarra (ES); Jose Miguel Garcia Sayes, Navarra (ES); Ivan Garcia Maestre, Navarra (ES); Alfonso Ruiz Aldama, Navarra (ES); Asier Gomez Andueza, Navarra (ES); Jose Luis Aristegui Lantero, Navarra (ES); Ander Gaston Lujambio, Navarra (ES); Miguel Nunez Polo, Navarra (ES)

(73) Assignee: Acciona Windpower, S.A., Sarriguren, Navarra (ES)

( * ) Notice: Subject to any disclaimer, the term of this patent is extended or adjusted under 35 U.S.C. 154(b) by 303 days.

(21) Appl. No.: 13/724,470

(22) Filed: Dec. 21, 2012

(65) Prior Publication Data
US 2014/0175038 A1    Jun. 26, 2014

(51) Int. Cl.
| | | |
|---|---|---|
| *B66C 23/00* | (2006.01) | |
| *E04H 12/34* | (2006.01) | |
| *F03D 1/00* | (2006.01) | |
| *F03D 1/04* | (2006.01) | |
| *E04H 12/00* | (2006.01) | |
| *B66C 23/20* | (2006.01) | |

(52) U.S. Cl.
CPC ............ *E04H 12/342* (2013.01); *B66C 23/207* (2013.01); *E04H 12/00* (2013.01); *F03D 1/001* (2013.01); *F03D 1/04* (2013.01); *F05B 2240/912* (2013.01); *Y02E 10/728* (2013.01)

(58) Field of Classification Search
CPC .... B66C 23/185; B66C 23/207; B66C 23/28; B66C 23/283; B66C 23/286; B66C 23/30; B66C 23/305; B66C 23/32; F03D 1/001; F05B 2240/912; E04H 12/342; E04H 12/18
See application file for complete search history.

(56) References Cited

U.S. PATENT DOCUMENTS

| | | | |
|---|---|---|---|
| 4,272,929 A * | 6/1981 | Hanson ............................ 52/40 |
| 6,357,549 B1 * | 3/2002 | Brennan et al. ............... 182/133 |
| 6,868,646 B1 | 3/2005 | Perina | |
| 8,011,098 B2 | 9/2011 | Vorhies et al. | |
| 2003/0183594 A1 * | 10/2003 | Torres Martinez ........... 212/196 |
| 2007/0151194 A1 * | 7/2007 | Livingston et al. ........ 52/651.05 |

(Continued)

FOREIGN PATENT DOCUMENTS

| | | | |
|---|---|---|---|
| EP | 1857670 A1 * | 5/2006 | |
| WO | 2011031577 A2 | 3/2011 | |

(Continued)

*Primary Examiner* — Emmanuel M Marcelo
(74) *Attorney, Agent, or Firm* — McNees Wallace & Nurick LLC

(57) ABSTRACT

The wind turbine assembly system of the present invention comprises a lifting structure comprising at least first structural support elements configured to transmit stresses to the wind turbine tower during the hoisting of a wind turbine component and a crane configured to displace the wind turbine component towards the tower axis, the system further comprising a displaceable climbing element with respect to the lifting structure by means of guiding mechanisms, the displaceable climbing element incorporating second structural support elements dimensioned to at least partly support the weight of the lifting structure, where the first structural support elements are displaceable so that their relative position can vary with respect to the lifting structure.

31 Claims, 10 Drawing Sheets

(56) References Cited

U.S. PATENT DOCUMENTS

| | | | |
|---|---|---|---|
| 2010/0044330 A1* | 2/2010 | Vorhies et al. | 212/175 |
| 2010/0293781 A1* | 11/2010 | Foo et al. | 29/791 |
| 2011/0037279 A1* | 2/2011 | Alba | 294/1.1 |
| 2011/0123274 A1* | 5/2011 | Soe-Jensen | 405/195.1 |
| 2012/0131880 A1* | 5/2012 | Delago et al. | 52/745.18 |
| 2012/0308338 A1* | 12/2012 | von Ahn | 414/10 |
| 2014/0102039 A1* | 4/2014 | Wagner | 52/745.18 |
| 2014/0202971 A1* | 7/2014 | Bosco et al. | 212/296 |

FOREIGN PATENT DOCUMENTS

| | | |
|---|---|---|
| WO | WO 2012163906 A1 * | 12/2012 |
| WO | WO 2014082176 A1 * | 6/2014 |

\* cited by examiner

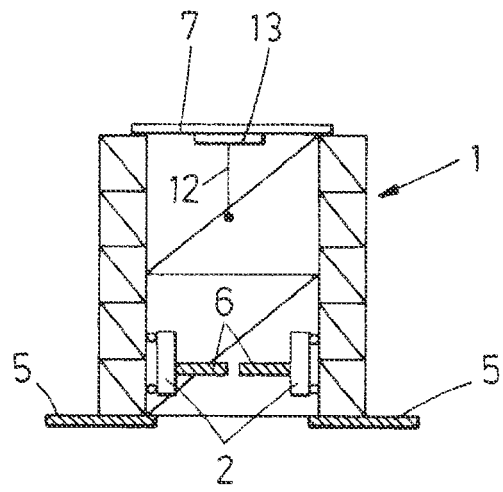
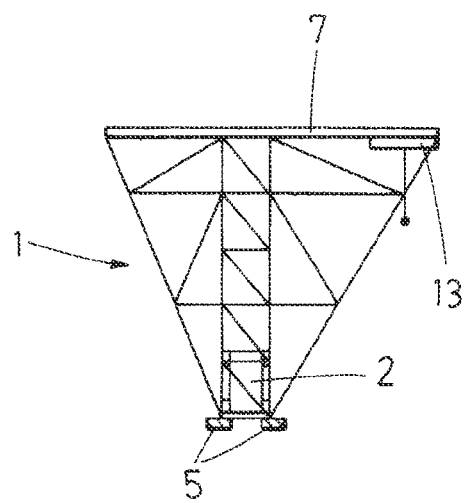
FIG.1A FIG.1B
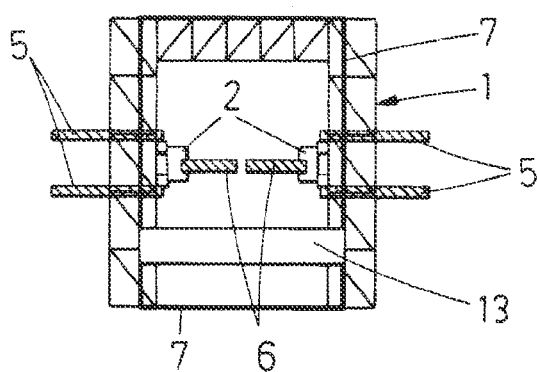
FIG.1C

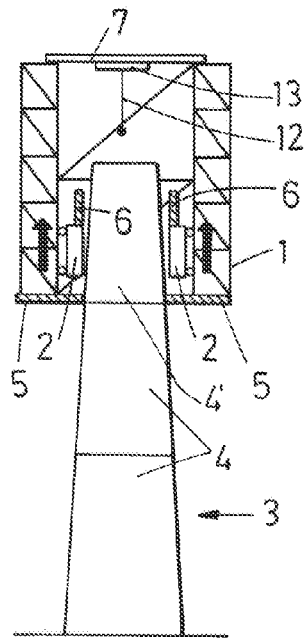
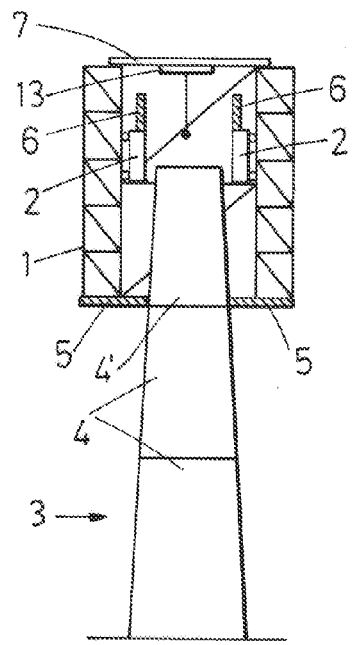
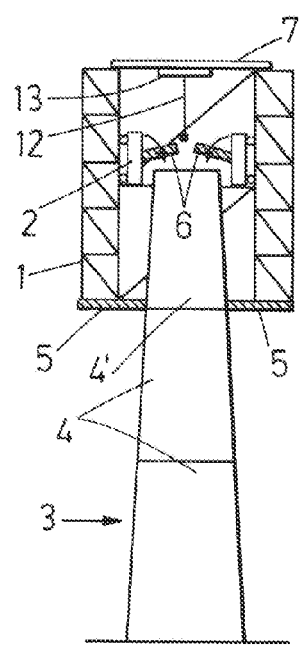
FIG.2A    FIG.2B    FIG.2C
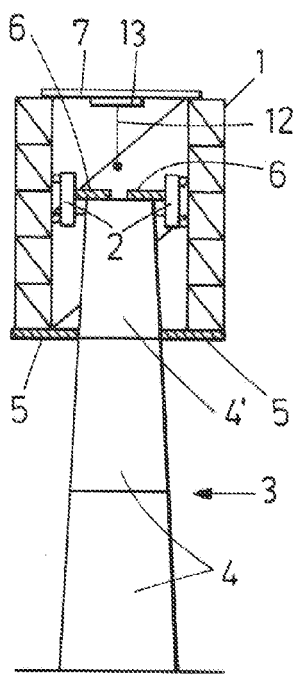
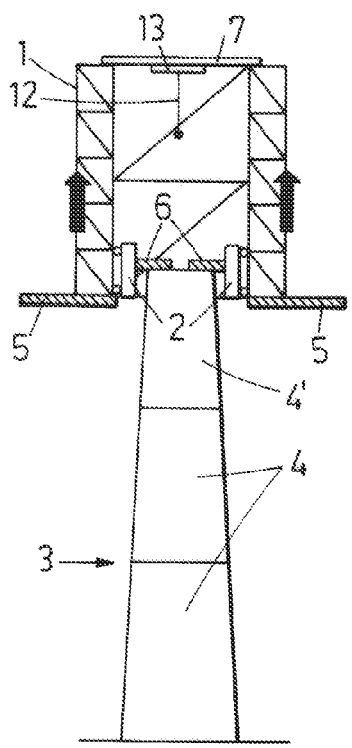
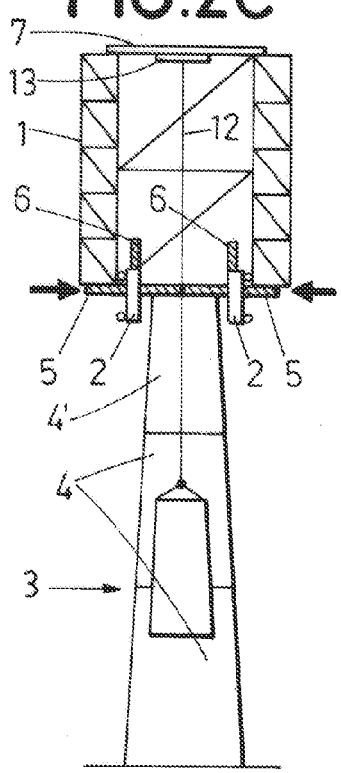
FIG.2D    FIG.2E    FIG.2F

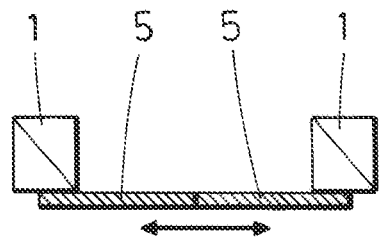
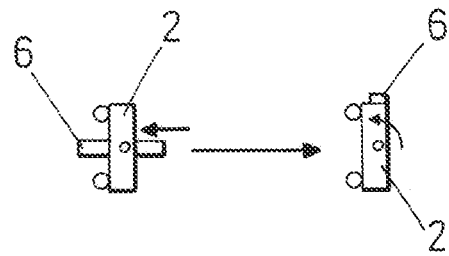
FIG.3A  FIG.3B
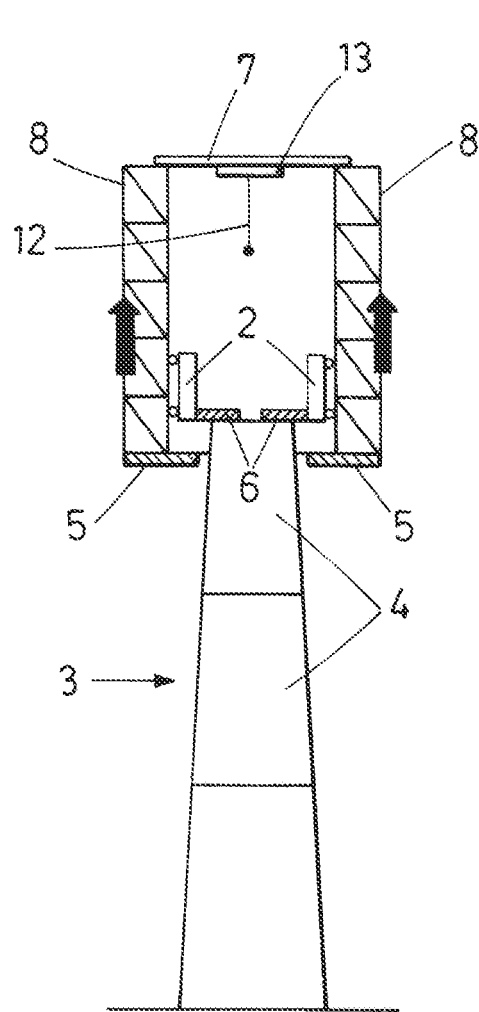
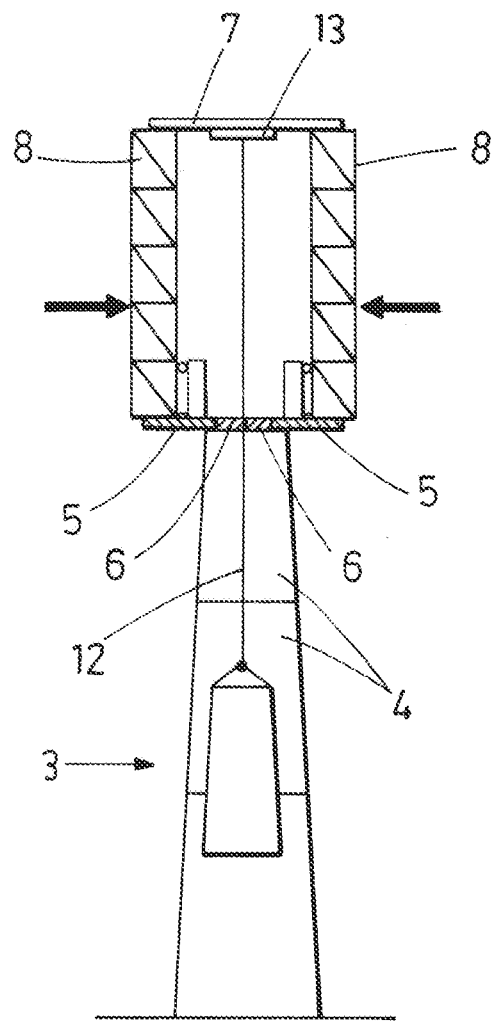
FIG.4A  FIG.4B

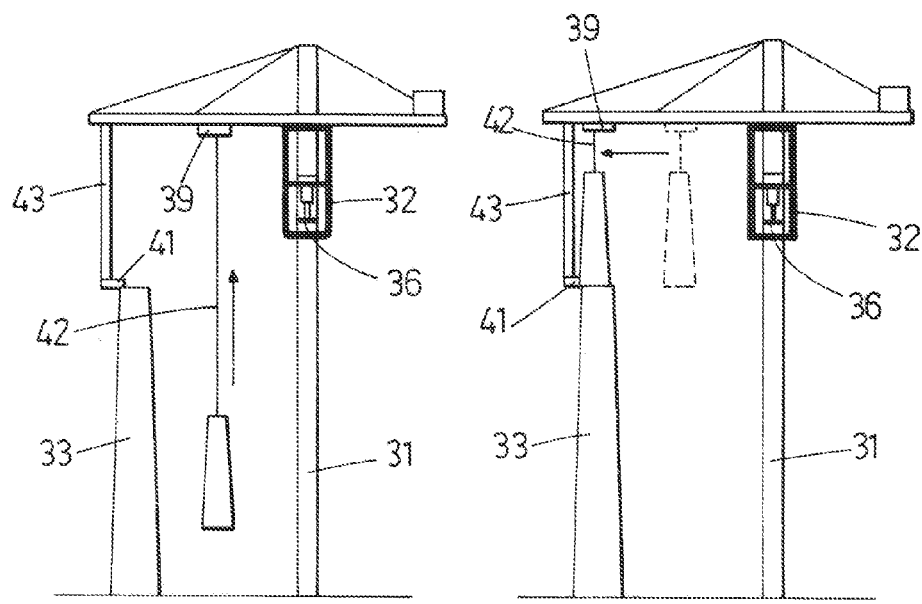
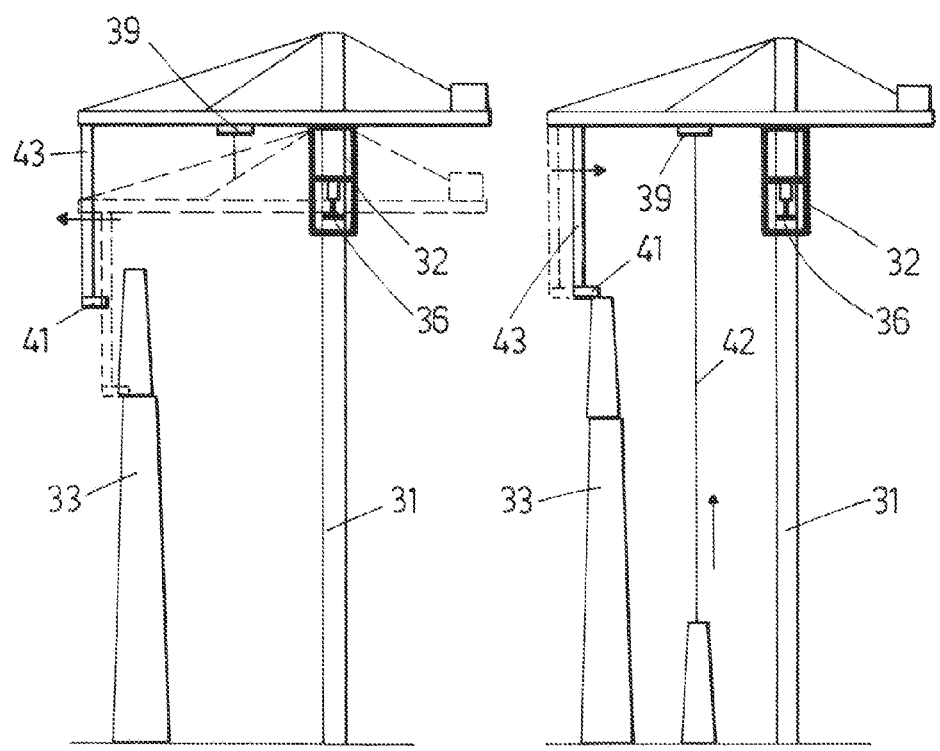
FIG.11A  FIG.11B  FIG.11C  FIG.11D

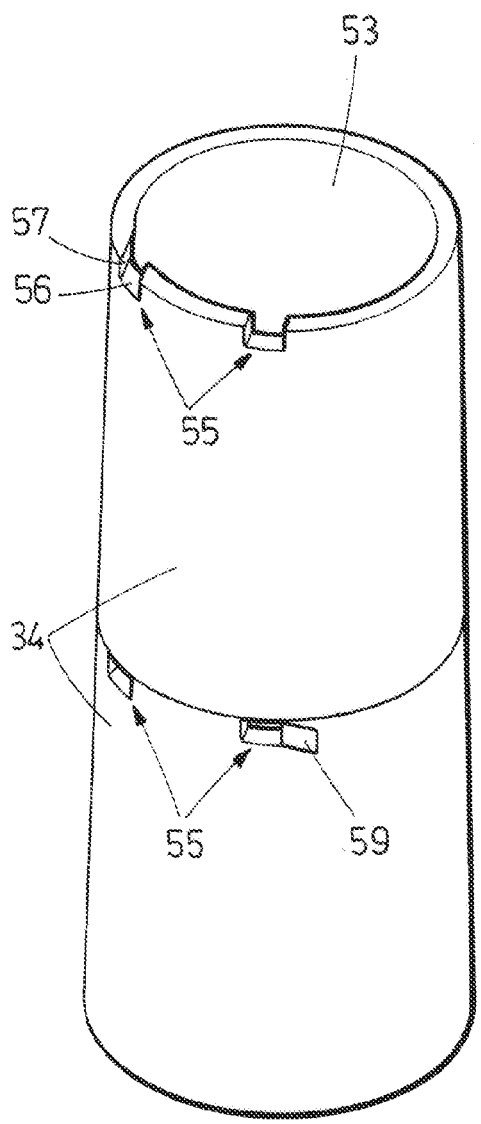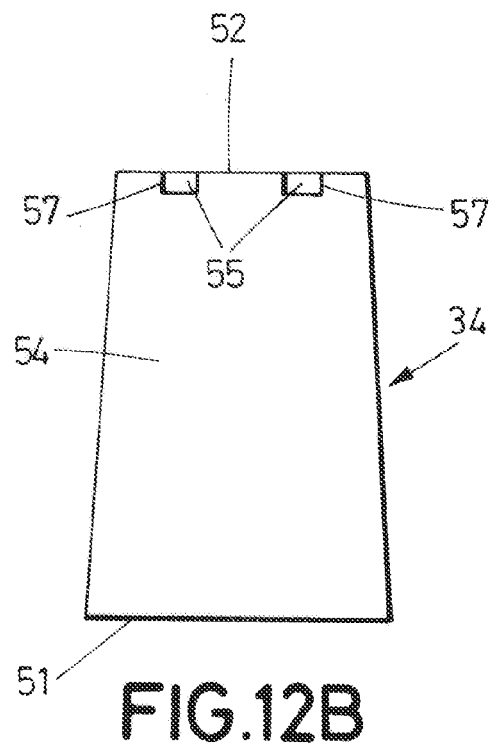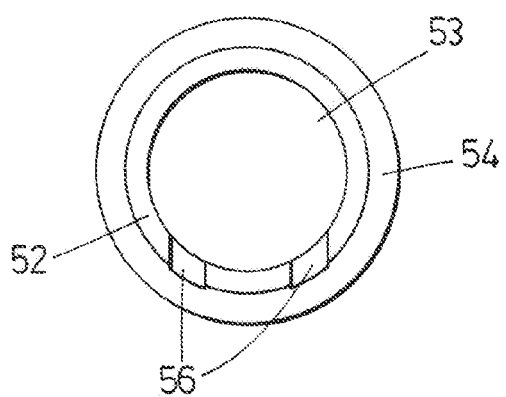

WIND TURBINE ASSEMBLY SYSTEM

OBJECT OF THE INVENTION

The present invention can be included in the technical field of wind turbine assembly systems.

The wind turbine assembly system of the present invention allows using a lifting structure, which as a whole is smaller than those used in the state of the art and is simpler to use, since a substantial part of the stresses associated to the hoisting of the components of the wind turbine is transmitted to the tower by structural support elements.

Additional objects of the invention are also the method to perform the assembly of a wind turbine according to the previous system, as well as the wind turbine tower assembled with the previous system.

BACKGROUND OF THE INVENTION

The increase in the rated power of wind turbines entails the increase in weights and dimensions of all the turbine components in general, but are of special relevance for the assembly costs of the following aspects:
 The height of the tower;
 Diameter of the rotor and weight of the blade-axle housing unit;
 Weight of the nacelle and subcomponents;
 Weight of the tower sections.

Of the above, the most relevant is the height of the tower, of which there are already designs of 120 m and more, especially for the assembly of relatively voluminous and heavy components such as the aforementioned: the large overturning moments associated to the increase in height make it necessary to have a high capacity crane (much greater than that simply associated to the weight of the components).

The use of these cranes is expensive, firstly due to the problems of availability that make the daily rental cost expensive: there is not a large amount of this type of cranes; and second, the high costs associated to transport due to the large number of trucks that are needed to move them. According to data shown in U.S. Pat. No. 8,011,098 B2, the rental costs of the crane for tower assembly, can come to $80000 per week, together with the almost $100000 of transport costs (using forty or more trucks).

These high costs justify the search for alternative means to build wind turbines, including the tower.

References are known in the state of the art related to two types of solution:
 Self-climbing systems (understanding as such structures that are supported and raised throughout the tower);
 Bridge-crane type solutions supported on lattices on the ground.

Among the climbing solutions, patent U.S. Pat. No. 6,868,646 B2 is known regarding a method and means for erecting a wind turbine tower.

Said means incorporate two structures: a lower one, whereto a hoist cable is fastened in a point close to the lower part, and an upper one, which supports the bridge crane-type structure. The hoist cable passes through a pulley fastened to a suitable fastening point in the tower close to the upper part of each section and it is collected in a winch located on the ground.

The system goes up and down the tower every time a section is assembled. Then, once assembled above the lower sections of the tower, the system descends, another section is again fastened and it is again hoisted. The lower structure incorporates a wheel/roller system adapted to cooperate with guides situated in the tower.

International application WO 2011/031577 A2 relates to a method and apparatus for wind turbine erection incorporating a caterpillar type system secured to the hoisting structure which makes it possible to move the hoisting structure along the tower by the effect of friction force between the tower and the caterpillar type system. Later, once the hoisting structure is in position, it is fastened to the tower and a new section is assembled. Therefore, the invention discloses caterpillar type systems which adapt to the conical shape of the tower. This system may be expensive due to its complexity, especially in conical solutions.

In terms of bridge crane-types structures, patent U.S. Pat. No. 8,011,098 B2 is known which discloses a crane-type structure supported by a self-supporting lattice incorporating actuators capable of lifting the lattice structure and the crane above them for inserting sections of additional lattice and therefore, gain height to be able to assemble more sections of the tower as it grows in height, and lastly the nacelle and the rotor. With the current tower perimeter dimensions, the sections of lattice must be assembled in situ, since they would exceed the transport dimensions. In said structure the tower sections are horizontally fed by means of carriages to also avoid the need of dispensing the sections by means of auxiliary cranes that position them close to the tower base.

The self-climbing structures can be light and of reduced dimensions, as they use the tower as support of the weight of the components assembled (or as much as it is assembled therefrom).

However, the self-climbing structures by pulleys, jacks or similar require a type of structure guide on the tower to guarantee that there is no interference with the tower during the lifting of the structure. In the case of a conical tower, a typical design if concrete is used, the guiding system becomes complicated, as it requires a spring-type element which guarantees the compression of wheels or rollers on the tower surface and which avoids said interference. Alternatively, the climbing is performed by friction between a mechanism disposed on the structure and the tower. In this case, it again requires that the mechanism is capable of adapting to the tower's conical nature.

Furthermore, the lattice-based structures, such as that shown, are large structures that will require a large number of trucks for their transport. They have the advantages, compared with climbing solutions, in that they can be used with any type of tower without the need to vary their design, since it is not necessary to provide them with additional fastening points or supports to fasten the climbing structure.

DESCRIPTION OF THE INVENTION

The present invention resolves the technical problem posed, by a wind turbine assembly system comprising:
 a lifting structure comprising at least:
  first structural support elements configured to be fastened to the wind turbine tower,
  a crane configured to displace the wind turbine component following a trajectory with at least one horizontal component,
 a climbing element displaceable upward with respect to the lifting structure by means of guiding mechanisms, the climbing element incorporating second structural support elements dimensioned to at least partly support the weight of the lifting structure, where the first structural support elements are further configured to transmit at least half of the stresses associated to the hoisting of a wind turbine component to the tower.

Furthermore, the first structural support elements are displaceable so that their relative position can vary with respect to the lifting structure. This characteristic allows the first structural support elements to be removed from the tower simply, minimising the number of components which must be dismantled to continue with the assembly of the next component and thus simplifying the entire process.

According to the invention, the crane is equipped with at least one structure, such as, for example, a beam or a lattice, comprising at least one horizontal guide and a pulley block displaceable along said guide. Said pulley block is configured to hoist the wind turbine component vertically from an area close to the base of the tower, such as, for example a platform or pre-assembly base.

According to the invention, the first structural support elements are configured to transmit a substantial part of the stresses associated to the hoisting of a wind turbine component to the tower, this wind turbine component being preferably a tower section. In particular, these first structural support elements are configured to transmit to the tower at least half of the stresses associated to the hoisting of a wind turbine component.

Furthermore, the second structural support elements can be displaceable elements, so that are configured to vary their position with respect to the climbing element.

In a first embodiment the first structural support elements are configured to transmit to the tower all the stresses associated to the hoisting of a wind turbine component, whilst the second structural support elements are configured to cooperate with the wind turbine tower and transmit to it at least partly the weight of the lifting structure.

In an embodiment alternative to the above, the second structural support elements are configured to be fastened to the lifting structure in the upper part and support at least the weight thereof corresponding to the crane and to the first support elements.

In this way, the wind turbine assembly system of the present invention makes it possible to use a lifting structure which, as a whole, is smaller than those used in the state of the art and is simpler to use, since a substantial part of the stresses associated to the hoisting of the wind turbine components is transmitted to the tower by the first structural support elements.

Furthermore, the climbing element displaceable with respect to the lifting structure makes it possible to lift at least part of the lifting structure, supporting at least the weight of the upper part thereof, so that the lifting structure can get taller as the wind turbine is assembled and facilitate the assembly thereof whilst dispensing the use of any kind of guide on the tower.

The method to perform the assembly of the wind turbine and the wind turbine tower assembled with the wind turbine assembly system also disclosed are also object of the present invention.

The method to perform the assembly of the wind turbine comprises the following stages:
  upward displacement of a climbing element with respect to a lifting structure of a wind turbine component,
  fastening of the climbing element by means of second structural support elements,
  lifting of the lifting structure with respect to the climbing element,
  fastening on the wind turbine tower of first structural support elements disposed on the lifting structure, due to the displacement of the first structural support elements with respect to the lifting structure,
  hoisting of the wind turbine component by the lifting structure,
  displacement of the wind turbine component towards the tower axis by means of a crane disposed on the lifting structure, The wind turbine tower object of the invention is formed by a plurality of longitudinal sections, the longitudinal sections comprising a lower surface, an upper surface, an internal lateral surface and an external lateral surface, where at least one of the longitudinal sections further comprises at least one slot disposed in an area close to at least one of the upper and lower surfaces, said slot being configured to fix first structural support means of a lifting structure of at least one wind turbine component.

DESCRIPTION OF THE DRAWINGS

To complement the description being made and in order to aid towards a better understanding of the characteristics of the invention, in accordance with an example of practical embodiment thereof, a set of drawings is attached as an integral part of said description wherein, with illustrative and non-limiting character, the following has been represented.

FIGS. 1A, 1B and 1C respectively show an elevational, side and plan view of the wind turbine assembly system in accordance with the first embodiment of the invention.

FIGS. 2A, 2B, 2C, 2D, 2E and 2F show the stages to perform the assembly of a wind turbine component using the wind turbine assembly system in accordance with the first embodiment of the invention.

FIG. 3A shows a detail of the movement that the first structural support elements follow with respect to the lifting structure in accordance with the first embodiment of the invention.

FIG. 3B shows a detail of the movement that the second structural support elements follow with respect to the climbing element in accordance with the first embodiment of the invention.

FIGS. 4A and 4B show the regulation carried out in the lifting structure to adjust to the diameter of the tower in accordance with the first embodiment of the invention.

FIGS. 11A to 11D show the stages to perform the assembly of a wind turbine according to the second embodiment of the invention.

FIG. 12A shows a perspective view of two sections of the wind turbine tower assembled with the wind turbine assembly system of the present invention.

FIGS. 12B and 12C shows an elevational and plan view of a section of the wind turbine tower assembled with the wind turbine assembly system of the present invention.

DETAILED DESCRIPTION OF THE INVENTION

Figure 5:
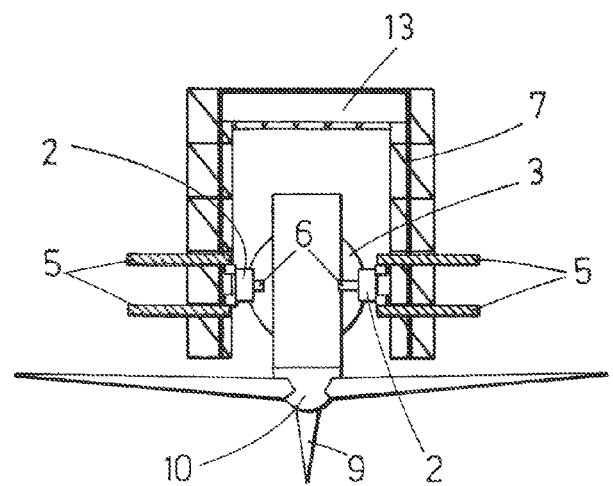
FIG. 5 shows a lifting structure of open type of the wind turbine assembly system in accordance with the first embodiment of the invention.

According to a first embodiment shown in FIGS. 1A, 1B and 1C, the wind turbine assembly system incorporates two elements that can be vertically displaced in a guided manner between one another, a lifting structure (1) and a climbing element (2). This mutual displacement can be carried out, for example, by means of vertical guides disposed on support columns (70) of the lifting structure (1) and means that cooperate with the vertical guides situated on the climbing element, or vice-versa, and making use of reversible actuation means.

The lifting structure (1) and the climbing element (2) are configured to be alternatively fastened on the tower (3) of the wind turbine when they are not displaced vertically as shown in FIGS. 2A to 2F, by means of first structural support elements (5) and second structural support elements (6) respectively, so that when the lifting structure (1) is fastened on a section (4) of tower (3), by means of the first structural support elements (5), and the immediately higher section (4) has already been assembled, the climbing element (2) is configured to be raised in a guided manner, by means of guiding mechanisms, preferably guides, belts or mechanisms similar to those used in self-climbing crane systems or lifts, and configured to be fastened in the upper area of the upper section (4) of the tower (3) by means of the second support elements (6), which are preferably retractable beams, configured to support the weight of the lifting structure (1) and be fastened on the tower (3).

Once the climbing element (2) is fastened, the lifting structure (1) is configured to be lifted, by means of guiding mechanisms, along the climbing element (2). Subsequently, and once the lifting structure (1) is fastened to the tower (3) by means of the first structural support elements (5), which are preferably retractable beams, and which are configured to transmit the stresses to the tower (3) during the hoisting of the components of the wind turbine and therefore, dimensioned for this, the second wind turbine component is hoisted by means of a crane (7) disposed on the lifting structure (1) comprising a first pulley block (13) displaceable horizontally along the crane (7) configured to displace the wind turbine component towards the tower axis (3). Said pulley block (13) is joined by a first end to a first end of a hoist cable (12), which is joined by a second end to the turbine component to be hoisted.

The stresses to be transmitted, for which the first structural support elements (5) are configured, include the weight of at least one section (4) of tower (3), part of the elements of the power train, the complete nacelle or the rotor.

Performing the climbing of the lifting structure along the tower using this system eliminates the need to have a guiding system on the tower that cooperates with the lifting structure to avoid the undesired interference thereof with the tower. As previously mentioned, in the event that the tower has a section that decreases with the height, the guiding system on the tower would be especially complicated.

The method to perform the assembly of a wind turbine according to this first embodiment, as shown in FIGS. 2A to 2F, comprises the following stages:

upward displacement of a climbing element (2) with respect to a lifting structure (1) of a wind turbine component, fastening of the climbing element (2) on the tower (3), by means of second structural support elements (6), lifting of the lifting structure (1) with respect to the climbing element (2), fastening on the wind turbine tower (3) of first structural support elements (5) disposed on the lifting structure (1), due to the displacement of the first structural support elements (5) with respect to the lifting structure (1), hoisting of the wind turbine component by a crane (7) disposed on the lifting structure (1), displacement of the wind turbine component towards the tower axis by means of the crane (7) disposed on the lifting structure (1), The stages of upward displacement of the climbing element (2) with respect to the lifting structure (1) and fastening of the displaceable climbing element (2) by means of the second structural support elements (6), are carried out when the first structural support elements (5) disposed on the lifting structure (1) have been fastened to a first section (4) of wind turbine tower (3), due to the displacement of the first structural support elements (5) with respect to the lifting structure (1), and a tower (3) section (4') immediately higher than the first (3) section (4) has already been assembled.

In this embodiment, the displaceable climbing element (2) is fastened on the tower by means of the second structural support elements.

FIG. 3A shows a detail of the movement followed by the first structural support elements (5) with respect to the lifting structure (1), which are horizontally retracted before the lifting of the lifting structure (1).

FIG. 3B shows a detail of the movement followed by the second structural support elements (6) with respect to the climbing element (2), which are horizontally retracted and can also be rotated 90° to be vertically disposed before performing the upward displacement of said climbing element (2), in this way allowing the lowering of the lifting structure (1) after assembly of the wind turbine.

Preferably, the lifting structure (1) comprises two columns (8) configured to adjust the width of the lifting structure (1) to the diameter of the tower section, as if said tower (3) is conical, its diameter can vary by more than 4 m from the base to the upper part.

This avoids the first structural support elements (5), which are preferably the retractable beams, from supporting very high bending moments when said lifting structure (1) is fastened on the higher sections (4) of the conical tower (3) as these higher sections have a smaller diameter than the ones closer to the tower (3) base. This is achieved since the lifting structure (1) is displaceable with respect to the crane (7) and the second structural support elements (6) by guide means and actuators which make it possible to bring the two columns (8) closer to one another when the lifting structure (1) is not fastened to the tower (3) instead it is supported by the second structural support elements (6) of the climbing element (2), as shown in FIGS. 4A and 4B.

Preferably, the lifting structure (1) of the assembly system is peripherally open, as shown in FIG. 5A, i.e. it does not completely surround the tower (3), and the crane (7) has a U-shape so that the system may be compatible with maintenance operations, avoiding the contact of the lifting structure (1) and of the crane (7) with some of the blades (9) of the rotor

(10) or with the nacelle, a contact which would exist if maintenance operations were performed with the lifting structure (1) and crane (7) shown in FIG. 1C.

Preferably, the assembly system incorporates one or several counterweight cables (11) which counteract the overturning moments in the tower (3) that appear when a wind turbine component is hoisted from a point non-coaxial with the tower (3). Said counterweight cables (11) are fastened by a first end to the foundation (14) of the tower (3), either by a fixed fastening or by a winch (15) fixed to the foundation (14) that allows the hoisting movement of the wind turbine components to be performed by the actuation thereof (15) since in this case the hoist cable (12) and the counterweight cable (11) coincide, and by a second end to the crane (7).

So that the tower (3) principally supports compression stresses during the hoisting of components, the counterweight cable (11) is fastened by its first end to the foundation (14) and by its second end to the crane (7) in a point we will call counterweight point (15), a diametrically opposite point with respect to the tower axis (3) to the point where the first end of the hoist cable (12) is fastened to the crane (7) of the lifting structure (1), which we will call hoisting point (16), in this way exercising a force of largely vertical component on said lifting structure (1). The hoist cable (12) is either fixed to this hoisting point (16) or is supported by a pulley, transmitting the vertical forces to it.

Figures 6, 7:
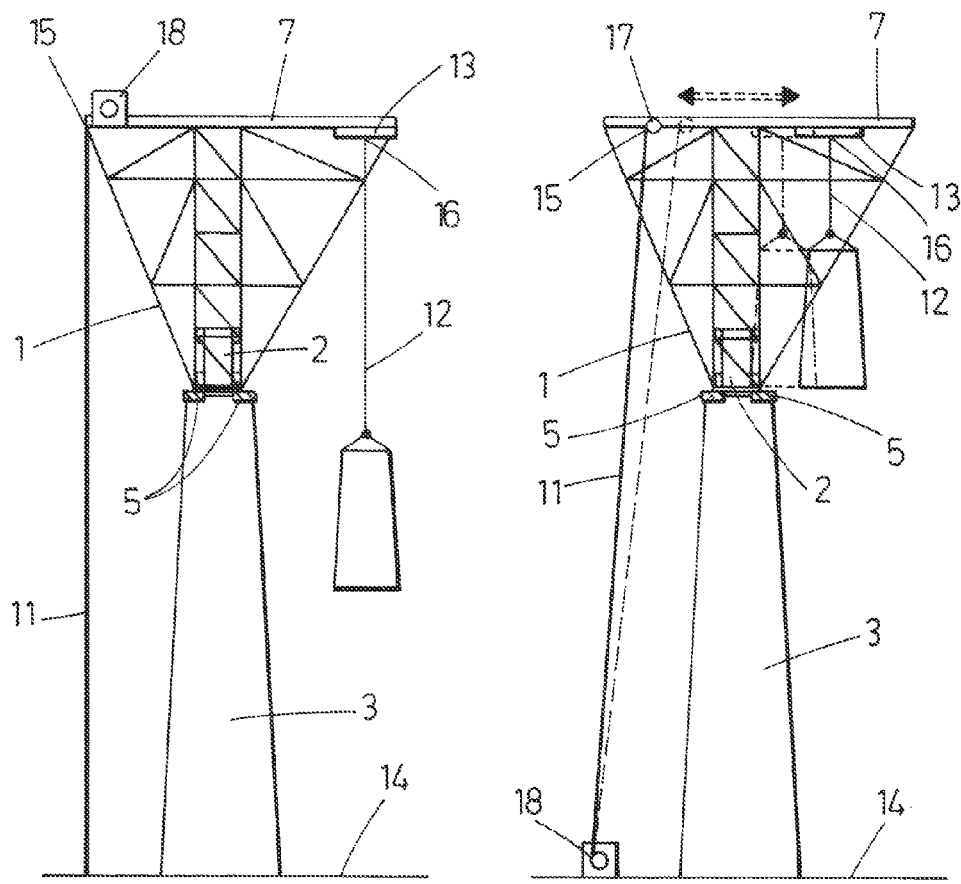
FIG. 6 shows the assembly system proposed in the present invention incorporating a counterweight cable fixed to the foundation with a fixed counterweight point which counteracts the overturning moments in the tower.
FIG. 7 shows the assembly system proposed in the present invention incorporating a winch fixed the foundation with a moving counterweight point which counteracts the overturning moments in the tower.

The counterweight point (15) can be fixed (FIG. 6), with the lifting structure (1) or the crane (7) incorporating in this case a fastening for the counterweight cable (11) whereto said counterweight cable (11) will be anchored in the second end using a different one for the hoist cable (12).

Alternatively, the counterweight point (15) can be moving (FIG. 7) since it is joined to the crane (7) by means of a second displaceable carriage (17). In this way, it is possible to coordinate the distances of the hoisting (16) and counterweight (15) points with respect to the tower axis (3), so that on displacing the wind turbine component to dispose it on the tower (3) and thus modifying the distance of the hoisting point (16) with respect to the tower axis (3) it modifies in coordinated manner the counterweight point (15) and the overturning moments acting on the tower can be cancelled out.

Figure 8:
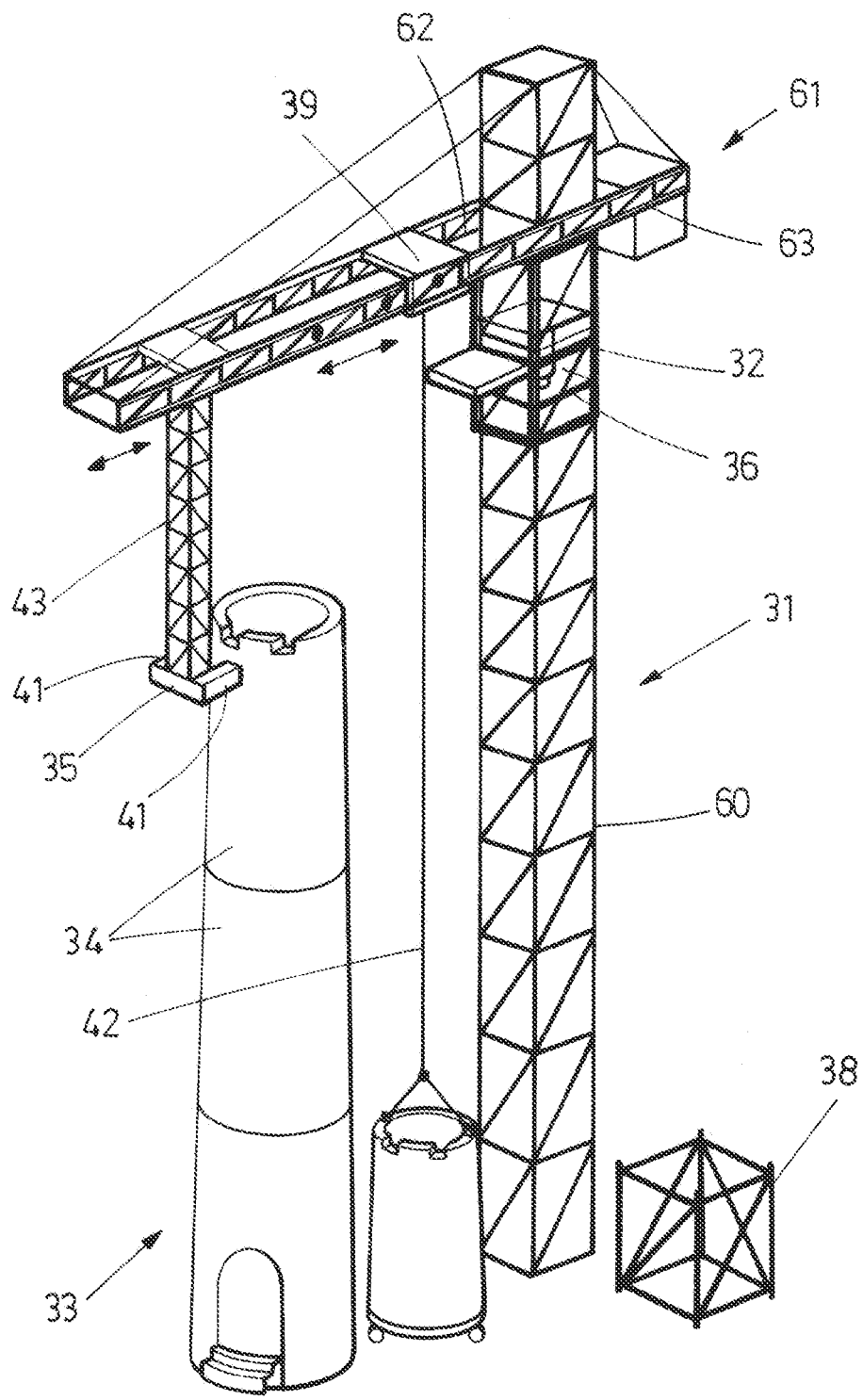
FIG. 8 shows a perspective view of the wind turbine assembly system in accordance with the second embodiment of the invention.

According to a second embodiment shown in FIG. 8, the wind turbine assembly system incorporates, as with the first example of embodiment, two elements that can be displaced upward and downward in guided manner between one another, a lifting structure (31) and a climbing element (32). This mutual displacement can be carried out by means of guides and making use of reversible actuation means.

In this second embodiment, part of the lifting structure (31) rests on the ground using a support column (60) and is configured to be fastened on the tower (33), by means of first structural support elements (35) during the hoisting of the wind turbine component, between which there is at least one section (34) of tower (33), part of the elements of the power train, the complete nacelle or the rotor.

The first structural support elements (35) of the lifting structure (31) comprise beams (41) which are fastened on the tower (33) and are joined to the lifting structure (31) through a structure (43) with the form of lattice which is horizontally displaceable with respect to said lifting structure (31) after assembling the part of the lifting structure (31) which is supported by the second structural support elements (36) of the climbing element (32).

The first structural support elements (35) are displaceable so that their relative position can vary with respect to the lifting structure (31) as previously commented by the displacement of the structure (43) with the form of lattice with respect to the lifting structure (31).

Figure 9:
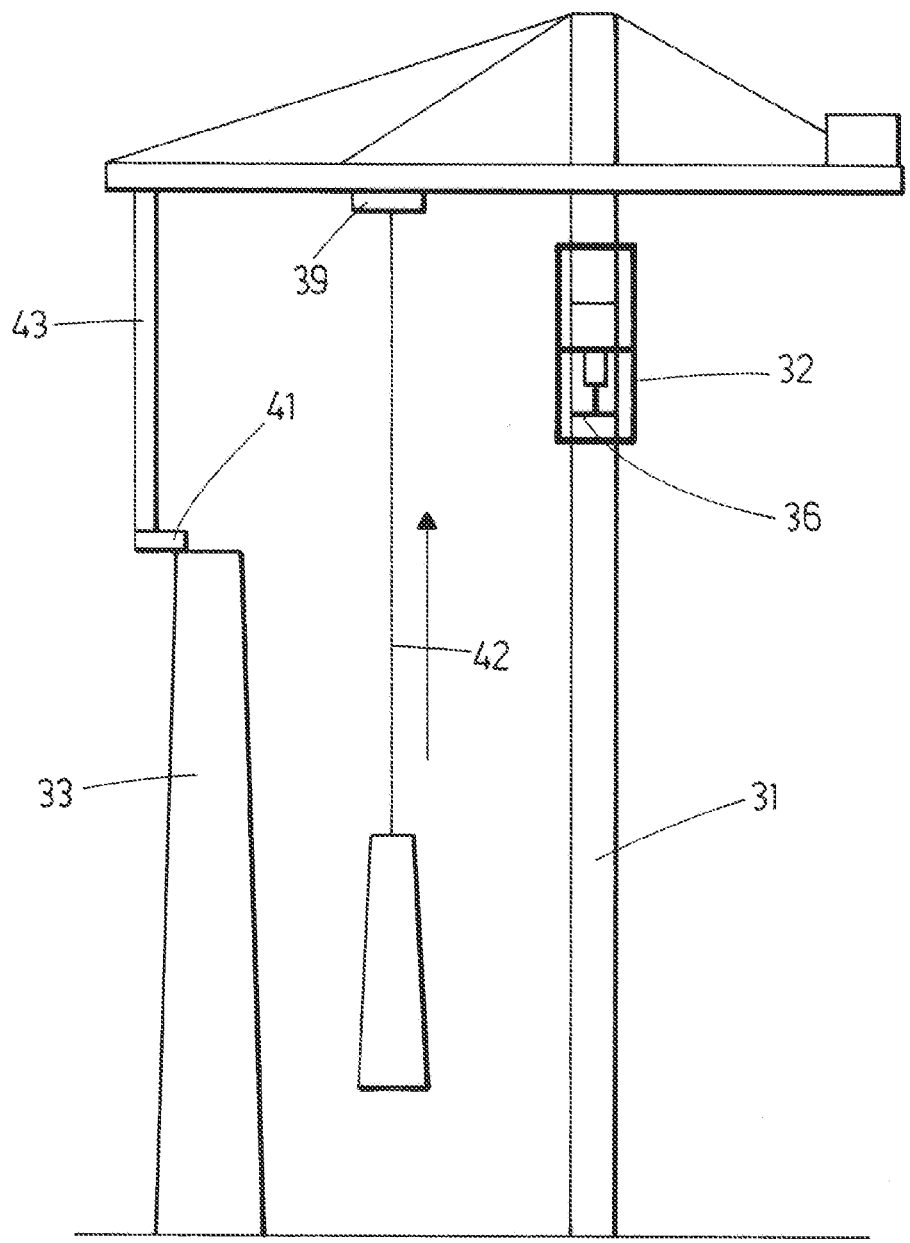
FIG. 9 shows an elevational view of FIG. 8 when the first structural support elements are fastened on the tower.

The lifting structure (31) further comprises a crane (61) equipped with at least one structure (62), such as, for example, a beam or a lattice, comprising at least one horizontal guide (63) and a pulley block (39) displaceable along said guide configured to displace the wind turbine component to be assembled towards the tower axis (33) when the first structural support elements (35) are fastened on the tower, as shown in FIG. 9. This horizontally displaceable pulley block (39) comprises a hoist cable (42) which is joined by a first end to said displaceable pulley block (39) and by a second end to the wind turbine component to be hoisted.

The climbing element (32) is fastened on the lifting structure (31) when it does not displace with respect thereto (31) and comprises second structural support elements (36) dimensioned to support the weight of the upper part of the lifting structure (31) when the assembly process of an additional element (38) is carried out, preferably with the form of lattice, of the lifting structure (31). In one embodiment the second structural support elements (36) are anchor bolts or pins which support the weight of at least the part corresponding to the crane and the first structural support elements (35).

Figure 10A:
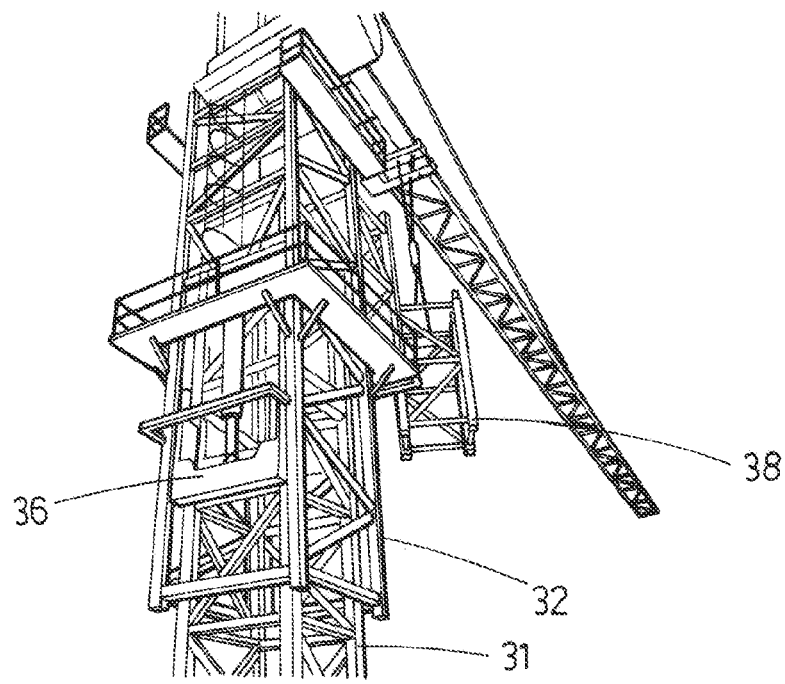
FIGS. 10A and 10B show two instants of the assembly process of an additional element of the lifting structure by means of the climbing element according to the second embodiment of the invention.
Figure 10B:
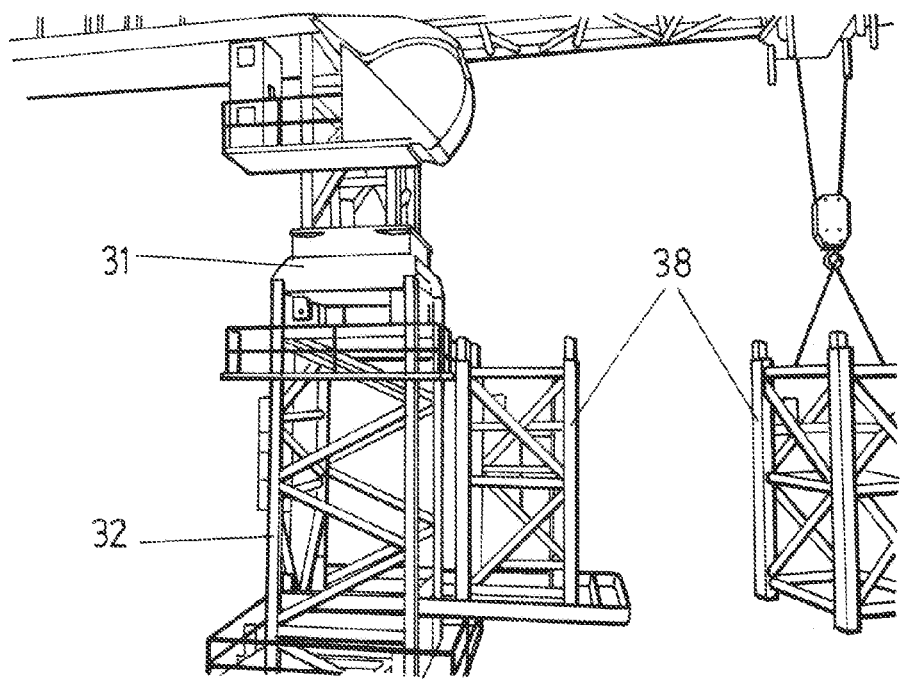

This assembly process of an additional element of the lifting structure (31) is shown in FIGS. 10A and 10B, where the upper part of the lifting structure (31) is lifted by the climbing structure (32), leaving an empty space between the upper part of the lifting structure (1) and the upper part of the support column (60), so that it is possible to house and anchor the additional element (38) with the form of lattice between said upper part of the lifting structure (31) and the part of the already assembled support column (60) thereof (31).

This configuration allows making less modifications in the tower (33) than in the first embodiment and to avoid hoisting overhanging loads, like in conventional tower cranes. The required counterweights are minimal, since they are only necessary to support the momentum introduced by the weight of the first structural support elements (5) and the lifting of the additional elements (38), preferably with the form of lattice, of the lifting structure (31).

The method to perform the assembly of a wind turbine according to the second embodiment and as shown in FIGS. 11A to 11D, comprises the following stages:

fastening of an upper part of a lifting structure (31) comprising a crane (7) to a climbing element (32), upward displacement of the climbing element (32) displaceable with respect to the lifting structure (31) of a wind turbine component, entailing the upward displacement of the upper part of the lifting structure (31) comprising the crane (7), lifting of the upper part of the lifting structure (31) to perform the assembly of an additional element (38) of the lifting structure (31), fastening of the climbing element (32) by means of second structural support elements (36), on a lower part of the lifting structure (1).

hoisting and assemblying of an additional element (38) of the lifting structure (31) between the upper part of the lifting structure (31) and the lower part of the lifting structure (31) after the fastening of the climbing element (32) by means of the second structural support elements (36), fastening on the wind turbine tower (33) of first structural support elements (35) disposed on the lifting structure (31), due to the displacement of the first structural support elements (5) respect to the lifting structure (1), hoisting of the wind turbine component by a pulley block (39) disposed in the lifting structure (31), horizontal displacement of the wind turbine component towards the tower axis (33) by means of the pulley block (39) disposed on the lifting structure (31), removal from the tower (33) of the first structural support means (35).

The wind turbine tower (33) is formed by a plurality of longitudinal sections (34), the longitudinal sections comprising (34) a lower surface (51), an upper surface (52), an internal lateral surface (53) and an external lateral surface (54), where at least one of the longitudinal sections (34) further comprises at least one slot (55) disposed in an area close to at least one of the upper (51) and lower (51) surfaces, as observed in FIGS. 12A and 12B, said slot (55) being configured to fix said first structural support means (35) of a lifting structure (31) configured to lift at least one wind turbine component towards said tower (33).

The slot (55) extends between the internal lateral surface (53) and the external lateral surface (54), so that it allows performing the fixing of the first structural support means (35) with ease from inside the tower (33), using as support for the operator platforms that the towers (33) typically have in the area close to the joints between longitudinal sections (34), platforms thereto disposed to perform assembly and maintenance tasks.

Preferably, at least one longitudinal section (34) comprises at least two slots (55) comprising a substantially horizontal surface (56) and two lateral surfaces (57), the lateral surfaces (57) of the slots (55) being parallel with one another, thus configured to allow the insertion of the first structural support elements (35) by a single movement.

Preferably, at least one longitudinal section (34), that comprising the slot (55), is of concrete reinforced by a metal frame, where in the area of the slot (55) it comprises a metal reinforcement to the frame, and the longitudinal section (34) comprises a closure (59) in the area of the slot (55) to prevent the entry of particles from the outside.

Figure 13A:
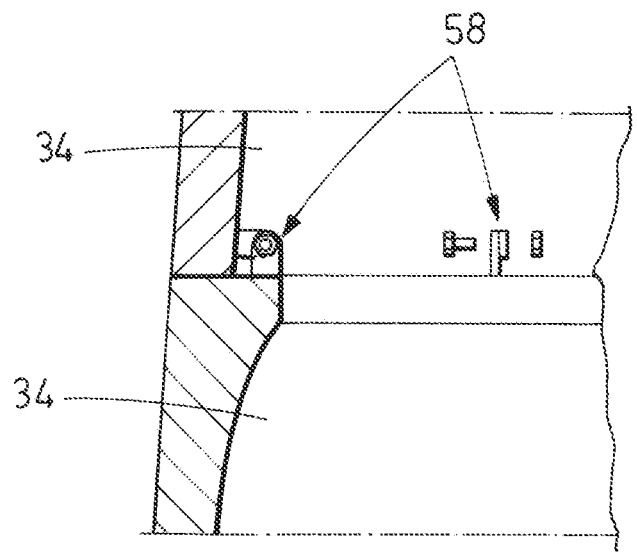
FIGS. 13A and 13B shows a sectional elevational view and a plan view of the auxiliary joining means between sections of tower configured to support assembly loads and wind-induced loads on the wind turbine without rotor.
Figure 13B:
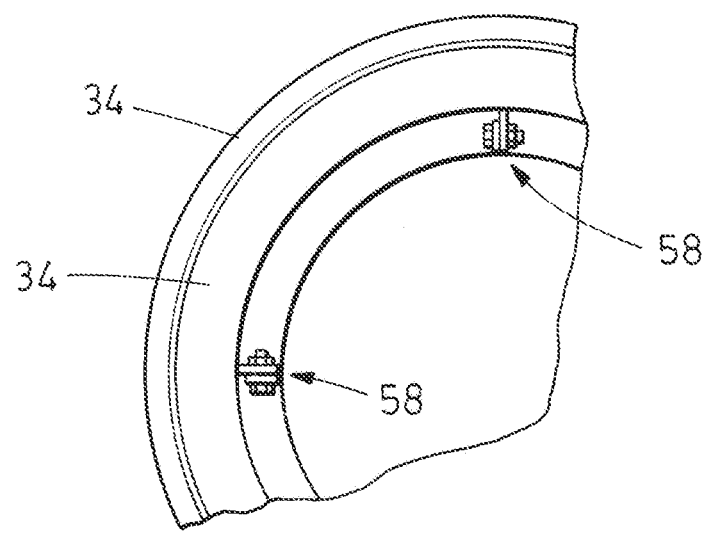

Furthermore, the tower (33) comprises auxiliary joining means (58) shown in FIGS. 13A and 13B configured to support assembly loads and wind-induced loads on the wind turbine without rotor but not loads induced by the rotor.

The invention claimed is:

1. Wind turbine assembly system comprising:
a lifting structure comprising at least:
first structural support elements configured to be fastened to a wind turbine tower,
a crane configured to displace a wind turbine component following a trajectory with at least one horizontal component,
a climbing element displaceable upward with respect to the lifting structure by means of guiding mechanisms, the climbing element incorporating second structural support elements dimensioned to at least partly support the weight of the lifting structure,
wherein the first structural support elements are further configured to transmit to the tower at least half of the stresses associated to the hoisting of the wind turbine component.

2. System according to claim 1, wherein the first structural support elements are displaceable so that their relative position can vary with respect to the lifting structure.

3. System according to claim 1, wherein the first structural support elements are configured to transmit all the stresses associated to the hoisting of the wind turbine component to the tower.

4. System according to claim 1, wherein the second structural support elements are displaceable elements configured to vary their position with respect to the climbing element.

5. System according to claim 4, wherein the second structural support elements are configured to transmit the weight of the lifting structure at least partly to the tower.

6. System according to claim 4, wherein the second structural support elements are configured to be fastened to the lifting structure in an upper part and support at least the weight thereof corresponding to the crane and to the first support elements.

7. System according to claim 1, wherein the crane is equipped with at least one structure comprising at least one horizontal guide and a pulley block displaceable along said guide.

8. System according to claim 7, wherein the pulley block is further configured to hoist the wind turbine component vertically from an area close to a base of the tower.

9. System according to claim 1, wherein the lifting structure is vertically displaceable with respect to the climbing element.

10. System according to claim 9, wherein the lifting structure comprises two columns configured to adjust a width of the lifting structure to a diameter of a tower section.

11. System according to claim 10, wherein the lifting structure is peripherally open and where the crane has a U-shape so that the system is compatible with maintenance operations.

12. System according to claim 11, wherein the counterweight cable is fastened by its second end to a second displaceable carriage of the crane configured to coordinate the distances between the second end of the counterweight cable and the first end of the hoist cable with respect to the tower axis.

13. System according to claim 1, wherein the crane comprises a first horizontally displaceable pulley block throughout the crane configured to displace the wind turbine component towards a tower axis once the lifting structure is fastened to the tower, where said pulley block is joined by a first end to a hoist cable, which is joined by a second end to the wind turbine component to be hoisted.

14. System according to claim 13, further comprising at least one counterweight cable which counteracts the overturning moments in the tower that appear when a wind turbine component is hoisted from a point non-coaxial with the tower and which is fastened by a first end to tower foundations and by a second end to the crane.

15. System according to claim 14, wherein the at least one counterweight cable is fastened to the foundations by means of a winch configured to perform the hoisting movement of the wind turbine components by the actuation thereof, and where the hoist cable and the counterweight cable are the same cable.

16. System according to claim 14, wherein the at least one counterweight cable is fastened by its second end to the crane in a diametrically opposite point with respect to the tower axis to the point where the first end of the hoist cable is fastened to the crane so that the tower principally supports compression stresses during the hoisting of a component.

17. System according to claim 1, wherein part of the lifting structure rests on the ground using a support column and is configured to be fastened on the tower, by means of the first structural support elements during the hoisting of the components of the wind turbine.

18. System according to claim 17, wherein the first structural support elements of the lifting structure comprise beams configured to be fastened on the tower and to be joined to the lifting structure through a structure with the form of lattice which is horizontally displaceable with respect to said lifting structure.

19. System according to claim 18, wherein the crane comprises a horizontally displaceable pulley block configured to displace the wind turbine component to be assembled towards the tower when the first structural support elements are fastened on the tower, where the horizontally displaceable pulley block comprises a hoist cable which is joined by a first end to said displaceable pulley block and by a second end to the wind turbine component to be hoisted.

20. Method to perform the assembly of a wind turbine comprising the following stages:
    upward displacement of a climbing element with respect to a lifting structure of a wind turbine component,
    fastening of the climbing element by means of second structural support elements,
    lifting of at least one part of the lifting structure with respect to the climbing element,
    fastening on a wind turbine tower of first structural support elements disposed on the lifting structure after the displacement of the first structural support elements with respect to the lifting structure,
    hoisting of the wind turbine component by the lifting structure,
    displacement of the wind turbine component towards a tower axis by means of a crane disposed on the lifting structure.

21. Method to perform the assembly of a wind turbine according to claim 20, wherein the stages of upward displacement of the climbing element with respect to the lifting structure of a wind turbine component, and fastening of the displaceable climbing element by means of the second structural support elements, are carried out when of the first structural support elements disposed on the lifting structure have been fastened to a first section of wind turbine tower and a tower section immediately higher than the first tower section has already been assembled.

22. Method to perform the assembly of a wind turbine according to claim 21, wherein the fastening of the displaceable climbing element by means of the second structural support elements is performed on the tower.

23. Method to perform the assembly of a wind turbine according to claim 20 wherein previously to the stage of upward displacement of a climbing element with respect to the lifting structure of a wind turbine component, an upper part of the lifting structure comprising the crane is fastened to the climbing element so that the upward displacement of the climbing element with respect to the lifting structure of the wind turbine component entails an upward displacement of the upper part of the lifting structure comprising the crane.

24. Method to perform the assembly of a wind turbine according to claim 23 wherein the fastening of the climbing element by means of second structural support elements is carried out after the stage of upward displacement of the climbing element with respect to the lifting structure of the wind turbine component, wherein the fastening of the climbing element is carried out by means of the second structural support elements on an lower part of the lifting structure.

25. Method to perform the assembly of a wind turbine according to claim 24 wherein the stage of:
    lifting of at least one part of the lifting structure with respect to the climbing element comprises hoisting and assembly of an additional element of the lifting structure between the upper part of the lifting structure comprising the crane and the lower part of the lifting structure after the stage of fastening of the climbing element by means of the second structural support elements.

26. Method to perform the assembly of a wind turbine according to claim 20, comprising a stage of:
    removal from the tower of the first structural support means after the stage of displacement of the wind turbine component towards the tower axis.

27. Wind turbine tower comprising a plurality of longitudinal sections, the longitudinal sections comprising a lower surface, an upper surface, an internal lateral surface and an external lateral surface, wherein at least one of the longitudinal sections further comprises at least one slot disposed in an area close to at least one of the upper and lower surfaces, said slot being configured to fix first structural support elements of a lifting structure of a wind turbine assembly system comprising:
    the lifting structure that comprises at least:
        the first structural support elements that are configured to be fastened to the wind turbine tower,
        a crane configured to displace a wind turbine component following a trajectory with at least one horizontal component,
    a climbing element displaceable upward with respect to the lifting structure by means of guiding mechanisms, the climbing element incorporating second structural support elements dimensioned to at least partly support the weight of the lifting structure,
    wherein the first structural support elements are further configured to transmit to the tower at least half of the stresses associated to the hoisting of the wind turbine component.

28. Wind turbine tower according to claim 27, wherein the slot extends between the internal lateral surface and the external lateral surface, so that it allows performing the fixing of the first structural support means from the inside of the tower.

29. Wind turbine tower according to claim 27, wherein at least one longitudinal section comprises at least two slots comprising a substantially horizontal surface and two lateral surfaces, the lateral surfaces of the slots being parallel to one another, thus configured to allow the insertion of the first structural support elements by a single movement.

30. Wind turbine tower according to claim 27, wherein at least the longitudinal section comprising the slot is of concrete reinforced by a metal frame, where in the area of the slot it comprises a metal reinforcement to the frame, and the longitudinal section comprises a closure in the area of the slot to prevent the entry of particles from the outside.

31. Wind turbine tower according to claim 27, further comprising auxiliary joining means configured to support assembly loads and wind-induced loads on the wind turbine without rotor but not loads induced by the rotor.

* * * * *